United States Patent

Hansen et al.

[11] Patent Number: 6,006,527
[45] Date of Patent: Dec. 28, 1999

[54] REFRIGERATION SYSTEM

[75] Inventors: Kim Hansen, Augustenborg; Christian Bendtsen, Sydals, both of Denmark

[73] Assignee: Danfoss A/S, Nordborg, Denmark

[21] Appl. No.: 09/117,635

[22] PCT Filed: Feb. 26, 1997

[86] PCT No.: PCT/DK97/00084

§ 371 Date: Jul. 31, 1998

§ 102(e) Date: Jul. 31, 1998

[87] PCT Pub. No.: WO97/32170

PCT Pub. Date: Sep. 4, 1997

[30] Foreign Application Priority Data

Feb. 28, 1996 [DE] Germany .......................... 196 07 474

[51] Int. Cl.⁶ ............................. F16K 31/02; F25B 5/00
[52] U.S. Cl. ............................. 62/157; 62/200; 236/75; 251/129.05
[58] Field of Search .................. 62/157, 223, 175, 62/200; 236/75; 251/129.05, 129.08

[56] References Cited

U.S. PATENT DOCUMENTS

| | | | |
|---|---|---|---|
| 4,510,767 | 4/1985 | Komatsu et al. | 62/100 |
| 5,435,145 | 7/1995 | Jaster | 236/75 |

*Primary Examiner*—William Wayner
*Attorney, Agent, or Firm*—Lee, Mann, Smith, McWilliams, Sweeney & Ohlson

[57] ABSTRACT

A refrigeration system having a plurality of cooled surfaces, each of which has a thermostatically controlled refrigerant supply valve. The valves are pulse-width modulated, each having the same period and being so controlled so they have staggered openings relative to one another thus providing a more uniform load on the system.

13 Claims, 3 Drawing Sheets

REFRIGERATION SYSTEM

BACKGROUND OF THE INVENTION

The invention relates to a refrigeration system having a plurality of cooling surfaces, each of which is connected by way of a series-connected controlled valve to a common refrigerant supply device, and having a control arrangement connected to the valves.

The refrigerant supply device can here be formed by a heat-exchanger in which heat is extracted from brine. The heat is given up to a coolant which is cooled in a customary cooling circuit having one or more compressors, a condenser and a collector, the heat exchanger being provided with an expansion valve. The brine then flows through the cooling surfaces and absorbs heat there in order to cool the environment around the cooling surfaces. In another practical form, the cooling surfaces can also have refrigerant flowing directly through them, the refrigerant being channelled through a circuit containing one or more compressors, a condenser and a collector.

A refrigeration system of the kind mentioned in the introduction is known from EP 0 410 330 A2. The refrigeration system in that case has at least two compressors arranged in parallel in the refrigerant circuit, which compressors can be operated jointly or alternately individually to satisfy the cooling requirement at the various cooling points simultaneously. In this connection it is desirable for the frequency of switching-on of the individual compressors to be reduced in order to prolong their service life. A control arrangement which is connected to thermostatic valves is provided for controlling the compressors. The thermostatic valves relay only the necessary temperature information to the control unit, however, so that this controls the compressors accordingly. The control unit can also switch off individual cooling surfaces when their actual value falls below a predetermined reference value.

SUMMARY OF THE INVENTION

The invention is based on the problem of rendering loading on the refrigerant supply device more uniform.

In a refrigeration system of the kind mentioned in the introduction, this problem is solved in that the control arrangement generates for each valve a pulse-width modulated signal for operation of the valve, all signals having the same period, and in that the valves of the individual cooling surfaces open at staggered intervals with respect to one another.

There is a more uniform call upon the output of the refrigeration supply device with this construction. Since the individual valves open at staggered intervals, refrigerant is channelled through the cooling surfaces also at correspondingly staggered intervals. The control arrangement controls only the start of "refrigerant consumption", however. The end is determined for each cooling surface in dependence on its demand for refrigeration. The control arrangement controls the valve accordingly, that is, it closes it when sufficient refrigerant has flowed into the cooling surface. Viewed statistically, with a sufficiently large number of cooling surfaces a state will then be reached in which always a few cooling surfaces are being supplied with refrigerant, whilst other cooling surfaces are switched off. The larger is the number of cooling surfaces, the more uniform can one keep the loading on the refrigerant supply device. Useful results have also already been obtained in practice when only three or four cooling surfaces are operated in parallel with one another. Since all signals have the same period, that is, all valves open similarly but at staggered intervals, the refrigerating capacity can be distributed very uniformly via the distribution of the refrigerant, so that the loading on the refrigerant supply device is correspondingly uniform.

In a preferred construction, the period is constant. Not only are the periods for the individual valves the same, but also successive periods are the same. Control is therefore simplified. It is easier to define the parallelism of the individual valves during operation in that they are able to open at staggered intervals.

The valves are advantageously ON-OFF valves. Such valves can be operated, for example, under clocked control. The ratio of the open time to the sum of open and closed time then provides the opening degree which in turn determines the through-flow. At any rate, the valve is fully opened in the open time, so that is lets through the maximum possible flow of refrigerant. In the closed time, on the other hand, the valve is completely blocked. For that reason such a valve is especially suitable for the refrigeration system in question, because when it is open, it introduces the maximum possible flow of refrigerant into the cooling surface, that is, it takes away refrigerant from the compressors quickly but briefly, but in the closed state the refrigerant is available for other cooling surfaces.

In this connection, it is especially preferred for the control arrangement to have for each valve a controller which determines a pulse duty factor for the valve in dependence on the demand for refrigeration and supplies a corresponding signal. The control is effected therefore autonomously for each valve or for each cooling surface. The controller can be in the form of a separate component which is housed in the vicinity of each cooling surface. Alternatively, it can be part of the control arrangement. In particular, it can be realized in software or by programmed control. The controller receives temperature data from the cooling surface and adjusts the pulse duty factor so that this actual temperature approximates as closely as possible to a predetermined reference temperature. The reference value or reference temperature can be entered in the controller in known manner.

The control arrangement preferably produces for each controller a synchronizing pulse which is staggered with respect to other synchronizing pulses. Each controller responds identically to the synchronizing pulse allocated to it. In the simplest case, on receiving this synchronizing pulse, it opens the valve and holds it open for the proportion of the period which is needed based on the pulse duty factor. Alternatively, it is possible for the synchronizing pulse first to initiate a computation algorithm, the length of which is the same for all controllers, that is, which has the same number of processing steps for all controllers, and by means of which the controller determines the pulse duty factor from the temperature difference between reference and actual temperature and then opens the valve. What matters here is merely that all controllers operate identically, that is, open the valve always with the same delay after the appearance of the synchronizing pulse.

In an alternative construction, provision can be made for the control arrangement to generate a common synchronizing pulse for all controllers and for each controller to have a time-delay element, the delay time of which differs from other delay times. Whereas a synchronizing pulse for each controller requires each controller to be addressed or requires a separate lead for each controller, with a common synchronizing pulse for all controllers a relatively simple transfer of data can be achieved. The time offset between the different valves is then achieved by the fact that the individual controllers respond to the synchronizing pulse with different delays. The time offset can also be realized in this way as the individual valves are triggered.

Each controller preferably has a timer which determines the period. This timer is admittedly required as an extra element for each controller, but in return there is no longer any need to transfer the period additionally from the control arrangement to the controllers. The controller still requires the time information in order to determine the pulse duty factor.

In this connection it is especially preferred for the timers to be activated by the synchronizing pulses only under predetermined operating conditions. Such an operating condition can occur, for example, when switching on the refrigeration system. After that, the individual controllers can operate autonomously for a relatively long period of time. Currently available timers are accurate enough to maintain parallel operation of the controllers also over a relatively long period of time. Other operating conditions can be, for example, the change-over from day-time operation to night-time operation, when the refrigerating capacity is increased and reduced respectively. Finally, such a synchronizing pulse can be generated at predetermined longer periods of time, for example, every eight hours.

Preferably, several cooling surfaces are combined in groups. When there are many cooling surfaces, the delay time for an individual cooling surface may possibly be too short, because the delay time equals the period divided by the number of cooling surfaces. If several cooling surfaces are combined to form a group, the principle of shifted control can be transferred to the individual groups, that is, the cooling surfaces of one group are supplied jointly, by triggering all valves of that group simultaneously, but the valves of different groups are triggered at different times. The delay times become adequately long again.

In parallel with the cooling surfaces there is preferably provided an overflow path containing an overflow valve. Since it is possible for all cooling surfaces to be blocked by their valves, the overflow path provides an opportunity for refrigerant to circulate even when temporarily there is no flow through the cooling surfaces. Such an arrangement is especially advantageous when a secondary circuit is being used for the refrigerant, in which the refrigerant is formed, for example, by brine. The overflow valve can optionally be replaced by a simple throttle.

It is also advantageous for the refrigerant supply device to have a buffered supply. This enables high and low load peaks to be catered for, without the compressors having to be reversed.

Each cooling surface is preferably additionally connected in series with a thermostatic expansion valve. The functions of the expansion valve and the valve that is controlled by the control arrangement can therefore be isolated. The thermostatic expansion valve is chiefly responsible for filling the cooling surface, whilst the other valve regulates the amount of coolant that is taken from the circuit to charge the cooling surface.

Additionally, an adjusting valve can also be provided in series with the cooling surface. Such an adjusting valve can, for example, limit the flow-through in cases in which dissimilar cooling surfaces are used in parallel with one another.

BRIEF DESCRIPTION OF THE DRAWINGS

The invention is described hereinafter with reference to preferred embodiments in conjunction with the drawings, in which.

DETAILED DESCRIPTION OF THE INVENTION

Figure 1:
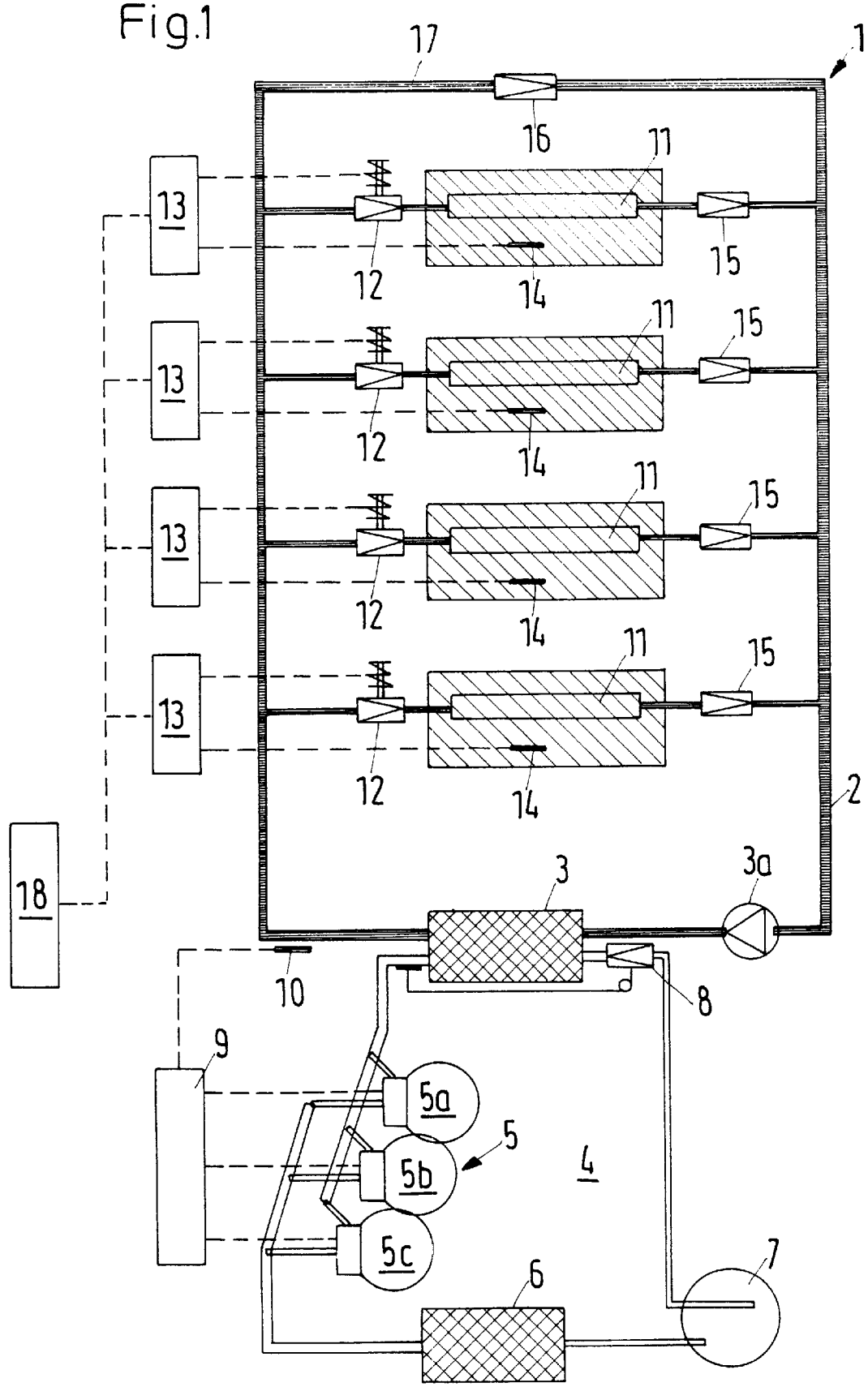
FIG. 1 shows a refrigeration system operated with brine.

A refrigeration system 1 in FIG. 1 comprises a brine circuit 2. Here, the brine passes through the secondary side of a heat exchanger 3, that is, an evaporator. The primary side of the heat exchanger 3 is supplied from a refrigerant circuit 4. The refrigerant circuit 4 has a compressor group 5 comprising several compressors 5a, 5b, 5c, a condenser 6, a collector 7 and a thermostatic expansion valve 8, which is arranged upstream of the heat exchanger 3. The compressor group 5 is controlled by a central unit 9 which is connected to a temperature sensor 10 which determines the temperature of the brine in the brine circuit 2 downstream of the heat exchanger 3. Depending on the temperature, the compressors 5 are operated with a lower or higher output or individual compressors are switched on or off.

Several cooling surfaces 11 are arranged in parallel with one another in the brine circuit 2. Cooling surface shall be understood in this application to mean any device which operates as heat exchanger between a refrigerant or the brine and an ambient medium. This applies even when the cooling surfaces 11 are not of planar construction but have a different form.

Each cooling surface 11 is in series with a valve 12, which is connected to a controller 13. From a temperature sensor 14 the controller 12 receives information about the temperature of the cooling surface 11 associated with the controller. Arranged in series with the cooling surface 11 there is furthermore an adjusting valve 15, with which the maximum flow-through can be adjusted. This is especially advantageous when cooling surfaces of different sizes or having different flow resistances are used.

In parallel with the cooling surfaces 14 there is arranged an overflow valve 16 in an overflow path 17.

All controllers 13 are connected to a common control unit. The control unit 18 and the controllers 13 together form a control arrangement.

The central unit 9 can optionally also be part of the control arrangement.

Figure 2:
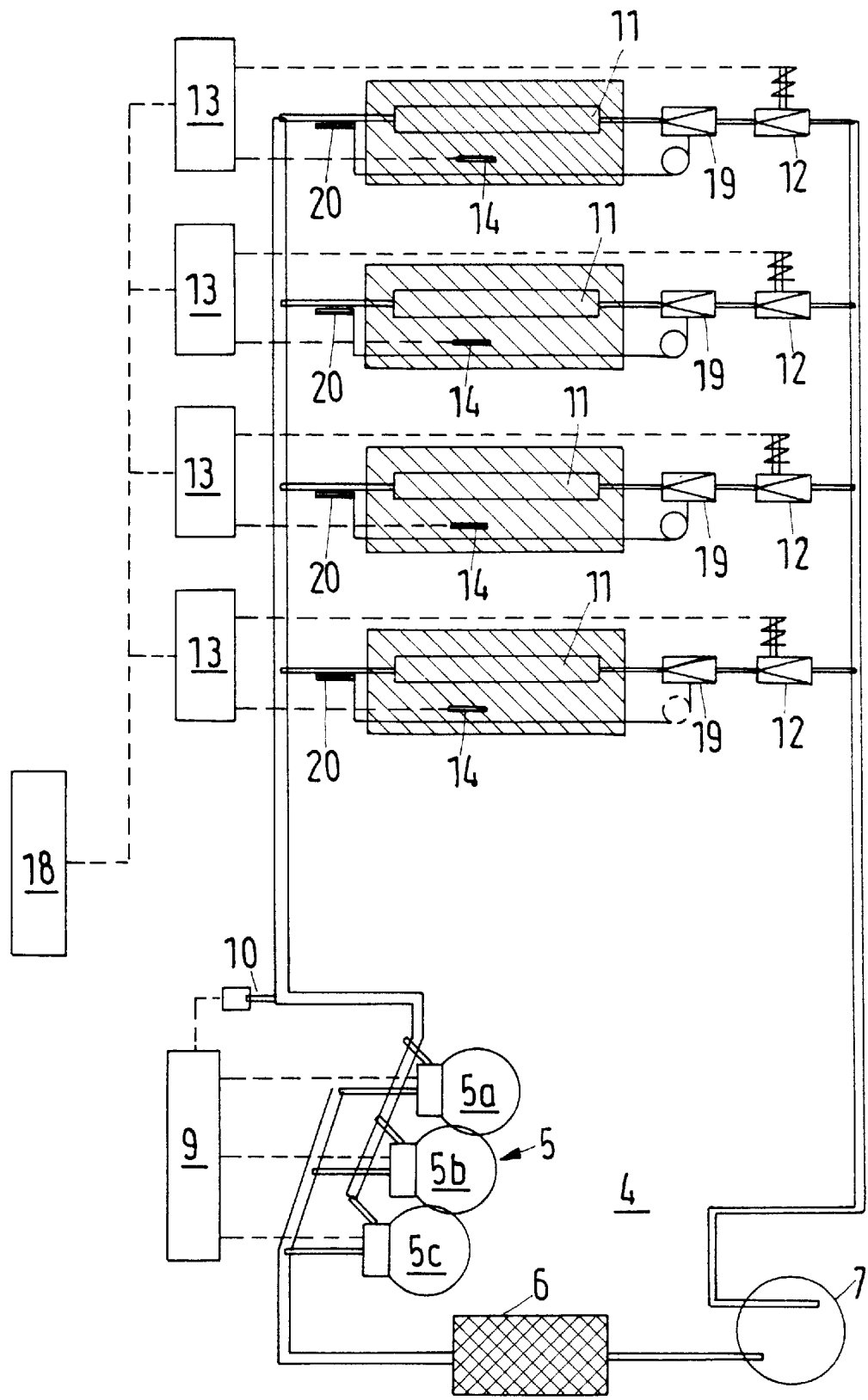
FIG. 2 shows a different embodiment of a refrigeration system.

An alternative configuration, in which identical and corresponding parts have been given the same reference numbers, is illustrated in FIG. 2. The cooling surfaces 11 are here no longer supplied by a secondary circuit which is fed with brine, but directly by the refrigerant from the refrigerant circuit 4. A thermostatic expansion valve 19 is accordingly arranged upstream of each cooling surface 11, and receives the necessary temperature information by way of a temperature sensor 20.

The valves 12 are in the form of ON-OFF valves in both embodiments. They therefore have only two operating positions. In the ON position they are fully open and unblock a path for the refrigerant, which is then able to flow either directly or by way of the expansion valves 19 into the cooling surface 11. In the closed state the flow of refrigerant into the cooling surface 11 is blocked.

When the valves are controlled so that always a few valves 12 are open and other valves 12 are closed, a relatively uniform loading of the refrigerant supply device that is arranged in the refrigerant circuit 4 can be achieved.

In order to embody this principle, the individual valves 12 are triggered at staggered intervals, which will be explained with reference to FIGS. 3 and 4.

Figure 3:
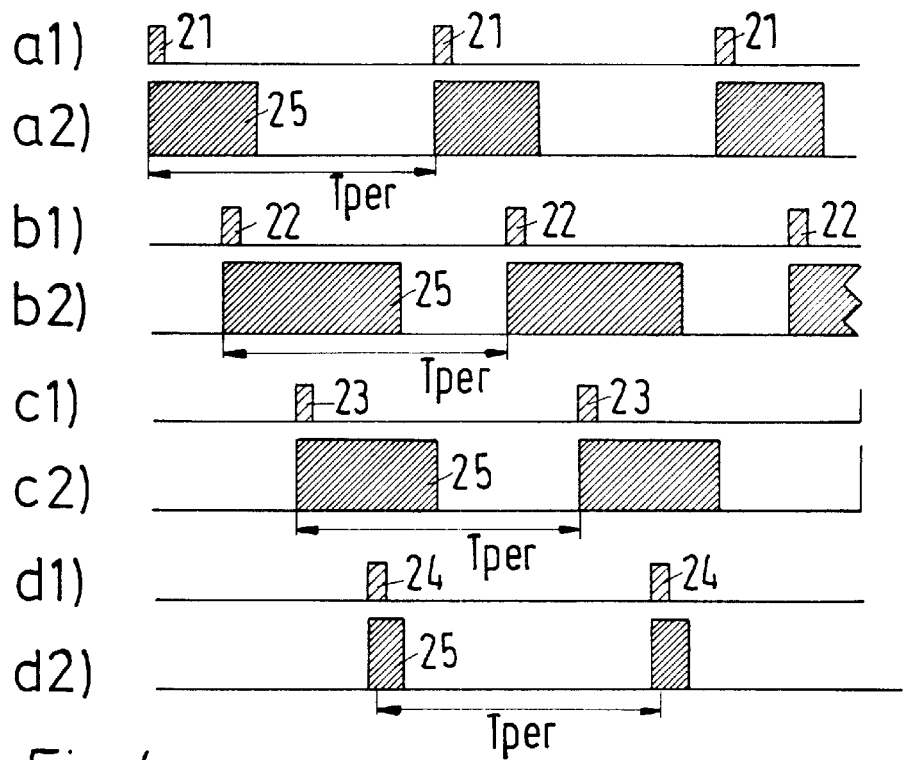
FIG. 3 is a diagrammatic representation of signal waveforms in a first embodiment and FIG. 4 is a diagrammatic representation of signal waveforms in a second embodiment.

In FIG. 3, the lines a, b, c, d each indicate signals for different valves 12. In the lines with the index 1 a respective synchronizing signal 21, 22, 23, 24 generated by the control unit 18 is illustrated. The individual synchronizing signals 21–24 are staggered with respect to one another. Identical synchronizing signals, for example, the signal 21, are generated at intervals with a period Tper. With four valves 12, different synchronizing signals are expediently staggered by a quarter period Tper/4 with respect to one another.

Further, in the lines that are provided with the index 2, control pulses 25 for the valves 12 are illustrated. These control pulses 25 are generated by the respective controllers 13 for the associated valve 12, namely, in dependence on the temperature at the cooling surface 11 determined by means of the temperature sensor 14. As long as the control signal 25 is present, that is, in the hatched time zones, the particular valve 12 is open. In line a the open time is about 38% of the period. In line b the opening degree is about 65% of the period. In line C the opening degree is about 55% of the period and in line d the open time is about 14% of the period. The period can be, for example, five minutes. The percentage open time corresponds exactly to the mean opening degree of the valve 12.

One can see that in this manner a relatively uniform loading of the refrigerant supply device can be effected. Certain fluctuations in the refrigerant requirement do occur, but these are restricted to relatively small portions of time. Such small portions of time can be catered for by the refrigerant supply in the collector 7.

Figure 4:
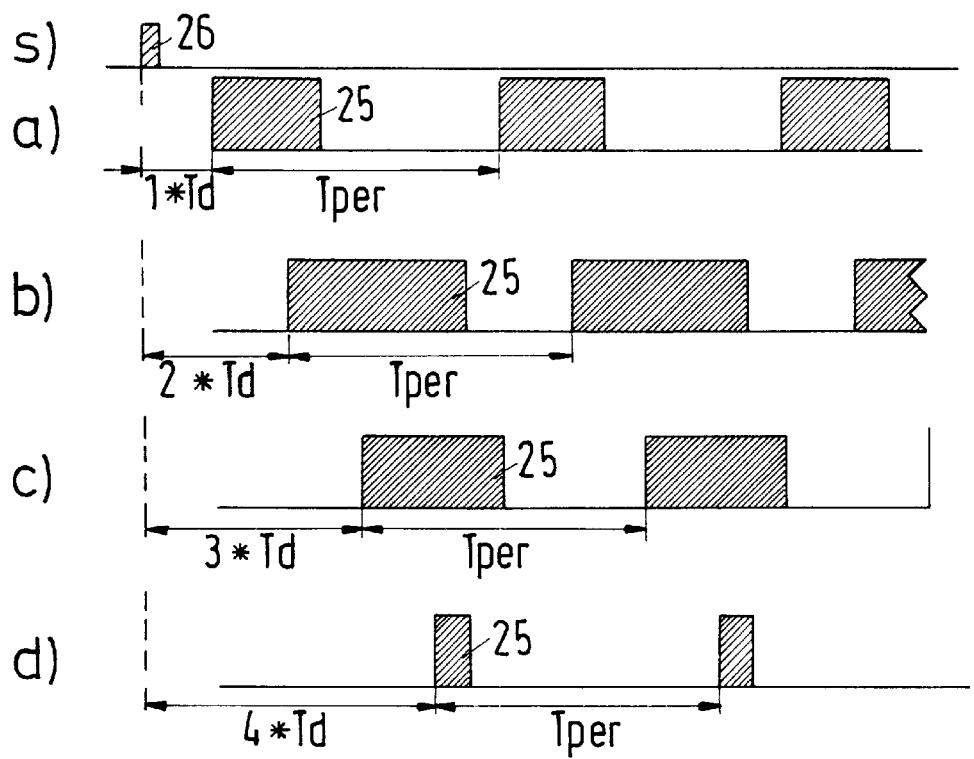

Whereas in the embodiment of FIG. 3 a synchronizing pulse 21–24 is needed for each valve, and has to be sent either by way of its own line or with a corresponding address to the controller 13, in the embodiment according to FIG. 4 a single synchronizing pulse 26 is sufficient. For that purpose, all that is needed is for each controller 12 to be provided with a delay element which triggers the control pulse 25 a predetermined duration after the start of the synchronizing pulse 26. The delay times Td are different for the four controllers. In this case they change in increments of ¼ period (Td=Tper/4). The pulse duty factor, that is, the ratio between the open time of the valve and the period Tper is similar to that in FIG. 3.

As one can see from FIG. 4, the synchronizing pulse 26 is supplied just once by the control unit 18, for example, at the start of operation of the refrigeration system. Thereafter, each controller 13 is operated autonomously. For that purpose it has another timer which provides clocked control of it at intervals corresponding to the period Tper. Each controller therefore has a periodic operation with the same period. Since inexpensive timers of acceptable accuracy are currently available, this option suffices to achieve a corresponding parallel operation of the controllers.

If instead of the illustrated four cooling surfaces a larger number of cooling surfaces is used, for example, more than 10, the last cooling surface may lag behind the first cooling surface by ten times the delay time of the first valve. As a result, the behaviour of the refrigeration system could be too sluggish. In order to shorten the total response time, individual cooling surfaces can then be combined in groups, for example, the first with the eleventh, twenty-first, thirty-first, the second with the twelfth, twenty-second, thirty-second etc.. The loading for the refrigerant supply device nevertheless remains relatively uniform. The delay times remain long enough even with relatively short periods.

What is claimed is:

1. Refrigeration system having a plurality of cooling surfaces, each of which is connected by way of a series-connected controlled valve to a common refrigerant supply device, and having a control arrangement connected to the valves, the control arrangement having means for generating for each valve a pulse-width modulated signal for operation of the valve, all pulse-width modulated signals having a same period, and having means for opening the valves of the individual cooling surfaces at staggered intervals with respect to one another.

2. Refrigeration system according to claim 1, in which the period is constant.

3. Refrigeration system according to claim 1, in which the valves are ON-OFF valves.

4. Refrigeration system according to claim 3, in which the control arrangement includes a controller for each valve, the controller having means to determine a pulse duty factor for the valve in dependence on the demand for refrigeration and to supply a corresponding signal.

5. Refrigeration system according to claim 4, in which the control arrangement includes means to produce a synchronizing pulse for each controller which is staggered with respect to the synchronizing pulses for each other controller.

6. Refrigeration system according to claim 5, in which the control arrangement includes means to generate a common synchronizing pulse for all controllers, each controller having a time-delay element including a delay time which differs from delay times for each other controller.

7. Refrigeration system according to claim 5, in which each controller has a timer which determines the period.

8. Refrigeration system according to claim 7, in which the timers are activated by the synchronizing pulses responsive to predetermined operating conditions.

9. Refrigeration system according to claim 6, in which controller has a timer which determines the period.

10. Refrigeration system according to claim 1, in which cooling surfaces are combined in groups.

11. Refrigeration system according to claim 1, in which the refrigerant supply device includes a buffered supply.

12. Refrigeration system according to claim 11 in which the buffered supply comprises a refrigerant collector.

13. Refrigeration system according to claim 1 including an overflow path for refrigerant supplied to the cooling surfaces.

* * * * *